(12) United States Patent
Cesa et al.

(10) Patent No.: US 12,388,304 B2
(45) Date of Patent: Aug. 12, 2025

(54) STATOR AND A STATOR HOUSING FOR AN ELECTRIC MACHINE

(71) Applicant: Jaguar Land Rover Limited, Coventry (GB)

(72) Inventors: Tiago Cesa, Coventry (GB); Alexandros Michaelides, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 477 days.

(21) Appl. No.: 17/298,000

(22) PCT Filed: Oct. 31, 2019

(86) PCT No.: PCT/EP2019/079785
§ 371 (c)(1),
(2) Date: May 27, 2021

(87) PCT Pub. No.: WO2020/108907
PCT Pub. Date: Jun. 4, 2020

(65) Prior Publication Data
US 2021/0399596 A1    Dec. 23, 2021

(30) Foreign Application Priority Data

Nov. 28, 2018   (GB) ...................... 1819335

(51) Int. Cl.
*H02K 1/18*     (2006.01)
*H02K 5/04*     (2006.01)
(Continued)

(52) U.S. Cl.
CPC ............. *H02K 1/185* (2013.01); *H02K 5/04* (2013.01); *H02K 5/207* (2021.01); *H02K 15/028* (2013.01); *H02K 15/14* (2013.01)

(58) Field of Classification Search
CPC .......... H02K 1/185; H02K 5/04; H02K 5/207; H02K 15/028; H02K 15/14; H02K 2213/03; H02K 15/02
See application file for complete search history.

(56) References Cited

U.S. PATENT DOCUMENTS

| | | | |
|---|---|---|---|
| 7,363,696 B2 * | 4/2008 | Kimura | .................. F01C 21/10 29/598 |
| 8,410,646 B2 | 4/2013 | Mori et al. | |

(Continued)

FOREIGN PATENT DOCUMENTS

| | | |
|---|---|---|
| EP | 0183319 A1 | 6/1986 |
| EP | 1533527 A1 | 5/2005 |

(Continued)

OTHER PUBLICATIONS

Great Britain Intellectual Property Office, Search Report under Section 17 Issued in Application No. GB1819335.9, May 8, 2019, 5 pages.

(Continued)

*Primary Examiner* — Tulsidas C Patel
*Assistant Examiner* — Riley Owen Stout
(74) *Attorney, Agent, or Firm* — McCoy Russell LLP (57) ABSTRACT

A stator and a stator housing for an electric machine is disclosed. The stator housing comprises an opening to receive the stator in a direction extending along a longitudinal axis of the electric machine to enable the stator housing to be shrink-fitted to the stator. The shape of the opening in the stator housing lying in a cross-sectional plane perpendicular to the longitudinal axis comprises four quarter circle arcs, with at least two of the quarter circle arcs being separated by a non-zero distance, the stator having a corresponding shape to the stator housing.

20 Claims, 6 Drawing Sheets

(51) Int. Cl.
  *H02K 5/20* (2006.01)
  *H02K 15/028* (2025.01)
  *H02K 15/14* (2025.01)

(56) References Cited

U.S. PATENT DOCUMENTS

| | | | |
|---|---|---|---|
| 8,943,673 B2 | 2/2015 | Schmidt et al. | |
| 2007/0114874 A1* | 5/2007 | Ku | H02K 1/28 310/216.004 |
| 2009/0108697 A1* | 4/2009 | Uetsuji | H02K 1/187 310/216.011 |
| 2009/0212649 A1* | 8/2009 | Kingman | H02K 5/203 310/91 |
| 2014/0128216 A1 | 5/2014 | Qin et al. | |
| 2015/0307123 A1 | 10/2015 | Shi et al. | |

FOREIGN PATENT DOCUMENTS

| | | |
|---|---|---|
| JP | H05268740 A | 10/1993 |
| JP | 2011072054 A | 4/2011 |
| WO | 2014185134 A1 | 11/2014 |
| WO | 2020108907 A1 | 6/2020 |

OTHER PUBLICATIONS

ISA European Patent Office, International Search Report Issued in Application No. PCT/EP2019/079785, Feb. 13, 2020, WIPO, 4 pages.
ISA European Patent Office, Written Opinion of the International Searching Authority Issued in Application No. PCT/EP2019/079785, Feb. 13, 2020, WIPO, 8 pages.
Great Britain Intellectual Property Office, Examination Report under Section 18(3) Issued in Application No. GB1819335.9, Sep. 28, 2020, 4 pages.

* cited by examiner

000
STATOR AND A STATOR HOUSING FOR AN ELECTRIC MACHINE

CROSS REFERENCE TO RELATED APPLICATIONS

The present application is a U.S. National Phase of International Application No. PCT/EP2019/079785 entitled "A STATOR AND A STATOR HOUSING FOR AN ELECTRIC MACHINE," and filed on Oct. 31, 2019. International Application No. PCT/EP2019/079785 claims priority to Great Britain Patent Application No. 1819335.9 filed on Nov. 28, 2018. The entire contents of each of the above-listed applications are hereby incorporated by reference for all purposes.

TECHNICAL FIELD

The present disclosure relates to a stator and a stator housing for an electric machine. Aspects of the invention relate to a stator for an electric machine, to a stator housing for an electric machine, to a method of manufacturing a stator housing for an electric machine, to an electric machine assembly comprising the stator and a stator housing, to an electric machine comprising the electric machine assembly, to a drive system for an electric vehicle and to a vehicle incorporating the drive system.

BACKGROUND AND SUMMARY

It is known to provide an electric motor having a rotor which turns a shaft to deliver mechanical power, and a stationary stator made up of steel laminations that surround the rotor. The rotor and stator are received in an aluminium stator housing which is shrink-fitted to the stator. Shrink-fitting ensures that the stator housing and the stator mate closely with each other and maintain tight contact so that heat is dissipated from the stator to the stator housing efficiently.

In an electric motor, the rotor generates torque which must be counteracted by the stator. However, as aluminium has a greater coefficient of thermal expansion than steel, the stator housing may expand more than the stator at higher temperatures resulting in undesirable rotation of the stator relative to the stator housing.

It is known to prevent rotation of the stator relative to the stator housing by providing a key on the stator which locates in a keyway formed in the stator housing. The key and keyway engage with each other to prevent relative rotation of the stator and the stator housing.

A problem with the known key and keyway solution is that, whilst relative rotation of the stator and stator housing is prevented, high stress concentrations in the stator and stator housing in the regions surrounding the key and the keyway can be generated due to the lack of support in the keyway area, causing bending forces at low operating temperatures as a result of the aluminium stator housing contracting more than the steel stator. In some electric motors, this problem is mitigated by allowing some 'give' in the construction of the stator laminations, which reduces the overall rigidity of the stator and allows some flexibility. However, to increase performance and reduce cost, it is becoming more common to glue stator laminations together which results in increased stator rigidity and a lower ability to flex in order to dissipate stress.

It is an aim of the present invention to address one or more of the disadvantages associated with the prior art.

Aspects and embodiments of the invention provide a stator and a stator housing for an electric machine, a stator for an electric machine, a stator housing for an electric machine, a method of manufacturing a stator housing for an electric machine, an electric machine assembly, and electric machine comprising the electric machine assembly, a drive system for an electric vehicle, and a vehicle incorporating the drive system, as claimed in the appended claims.

According to an aspect of the present invention there is provided a stator and a stator housing for an electric machine, the stator housing comprising an opening to receive the stator in a direction extending along a longitudinal axis of the electric machine to enable the stator housing to be shrink-fitted to the stator, wherein the shape of the opening in the stator housing lying in a cross-sectional plane perpendicular to the longitudinal axis comprises four quarter circle arcs, with at least two of the quarter circle arcs being separated by a non-zero distance, the stator having a corresponding shape to the stator housing.

The shape of the opening lying in said cross-sectional plane may comprise a first line extending between one end of each of two of said four quarter circle arcs, and a second line extending between one end of each of the other two quarter circle arcs.

In some embodiments, the first and second lines may be straight and parallel to each other, each of said first and second lines extending at a tangent to said ends of said quarter circle arcs.

The opposite ends of two of the four quarter circle arcs which do not have the first or second line extending between them, may be connected by a third line, and the opposite ends of the other two quarter circle arcs which do not have the first or second lines extending between them, may also be connected by a fourth line.

The third and fourth lines may be straight and parallel to each other, each of said third and fourth lines extending at a tangent to the opposite ends of said quarter circle arcs.

Optionally, the shape of the stator may be a rounded square.

In some embodiments, the opposite ends of two of the four quarter circle arcs may have a zero distance between them, the opposite ends of the other two of the four quarter circle arcs may also having a zero distance between them.

Optionally, the shape of the opening in the stator housing lying in a cross-sectional plane perpendicular to the longitudinal axis is obround.

In embodiments of the invention, the shape of the stator lying in a cross-sectional plane perpendicular to the longitudinal axis at any point along said longitudinal axis may be the same.

Optionally, the stator may be formed from a material with a smaller coefficient of thermal expansion than the stator housing.

The stator may be formed from steel and the stator housing may be formed from aluminium.

According to another aspect of the invention, there is provided a stator for an electric machine, the stator being configured for insertion, in a direction extending along a longitudinal axis of the electric machine, into an opening in a stator housing to enable the stator housing to be shrink-fitted to the stator, wherein the shape of the stator lying in a cross-sectional plane perpendicular to the longitudinal axis comprises four quarter circle arcs, with at least two of the quarter circle arcs being separated by a non-zero distance.

In embodiments, the shape of the stator lying in said cross-sectional plane comprises a first line extending between one end of each of two of said four quarter circle arcs, and a second line extending between one end of each of the other two quarter circle arcs.

The opposite ends of two of the four quarter circle arcs which do not have the first or second line extending between them, may be connected by a third line, and the opposite ends of the other two quarter circle arcs which do not have the first or second lines extending between them, may also be connected by a fourth line.

Optionally, the shape of the stator in a plane extending perpendicular to the longitudinal axis is a rounded square.

In certain embodiments, the opposite ends of two of the four quarter circle arcs have a zero distance between them, and the opposite ends of the other two of the four quarter circle arcs also having a zero distance between them.

Optionally, the shape of the stator lying in a cross-sectional plane perpendicular to the longitudinal axis is obround.

The shape of the stator lying in a cross-sectional plane perpendicular to the longitudinal axis at any point along said longitudinal axis may be the same.

According to another aspect of the invention, there is provided a stator housing for an electric machine, the stator housing comprising an opening configured to receive a stator inserted into the opening in a direction extending along a longitudinal axis of the electric machine to enable the stator housing to be shrink-fitted to the stator, wherein the shape of the opening in the stator housing lying in a cross-sectional plane perpendicular to the longitudinal axis comprises four quarter circle arcs, with at least two of the quarter circle arcs being separated by a non-zero distance.

The shape of the opening lying in said cross-sectional plane may comprise a first line extending between one end of each of two of said four quarter circle arcs, and a second line extending between one end of each of the other two quarter circle arcs.

In certain embodiments, the opposite ends of two of the four quarter circle arcs which do not have the first or second line extending between them, are connected by a third line, and the opposite ends of the other two quarter circle arcs which do not have the first or second lines extending between them, also being connected by a fourth line.

Optionally, the shape of the stator in a plane perpendicular to the longitudinal axis is a rounded square.

Optionally, the shape of the opening in the stator housing lying in a cross-sectional plane perpendicular to the longitudinal axis is obround.

According to another aspect of the invention, there is provided a method of manufacturing a stator housing for an electric machine, the stator housing comprising an opening configured to receive a stator inserted into the opening in a direction extending along a longitudinal axis of the electric machine to enable the stator housing to be shrink-fitted to the stator, the method of manufacturing the stator housing comprising:
  a. plunging a circular cutting tool in a first axial direction into material from which the stator housing is to be formed to form a circular opening,
  b. translating the circular cutting tool in a first direction extending at right-angles to the longitudinal axis; and
  c. removing said circular cutting tool in a second axial direction.

Translating the circular cutting tool in a direction extending at right-angles to the longitudinal axis may forms an opening in said material that has a shape, lying in a cross-sectional plane perpendicular to the longitudinal axis, which is obround.

The method may comprise, following said translating the circular cutting tool in the first direction extending at right-angles to the longitudinal axis and prior to removing said circular cutting tool in the second axial direction:
  a. translating the circular cutting tool in a second direction extending at right angles to the longitudinal axis and at right angles to the first direction;
  b. translating the circular cutting tool in a third direction extending at right-angles to the longitudinal axis in a direction opposite and parallel to the first direction;
  c. translating the circular cutting tool in a fourth direction extending at right angles to the longitudinal axis and at right angles to the first direction, in a direction opposite and parallel to the second direction.

Translating the circular cutting tool in said first, second, third and fourth directions may form an opening in said material that has a shape, lying in a cross-sectional plane perpendicular to the longitudinal axis, which is a rounded square.

The method may optionally include:
  a. removing said circular cutting tool in a second axial direction following said plunging the circular cutting tool in the first axial direction and prior to translating the circular cutting tool in the first direction extending at right-angles to the longitudinal axis;
  b. plunging said circular cutting tool in the first axial direction following said translating the circular cutting tool in the first direction extending at right-angles to the longitudinal axis.
  c. According to another aspect of the invention, there is provided an electric machine assembly comprising the stator and a stator housing of the invention, in which the stator housing is shrink-fitted to the stator.

According to yet another aspect of the invention, there is provided an electric machine comprising the electric machine assembly, and a rotor mounted for rotation about the longitudinal axis within the electric machine assembly.

According to another aspect of the invention, there is provided a drive system for an electric vehicle incorporating the electric machine.

According to another aspect of the invention, there is provided a vehicle incorporating the drive system.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE FIGURES

One or more embodiments of the invention will now be described, by way of example only, with reference to the accompanying drawings, in which.

DETAILED DESCRIPTION

Figure 8:
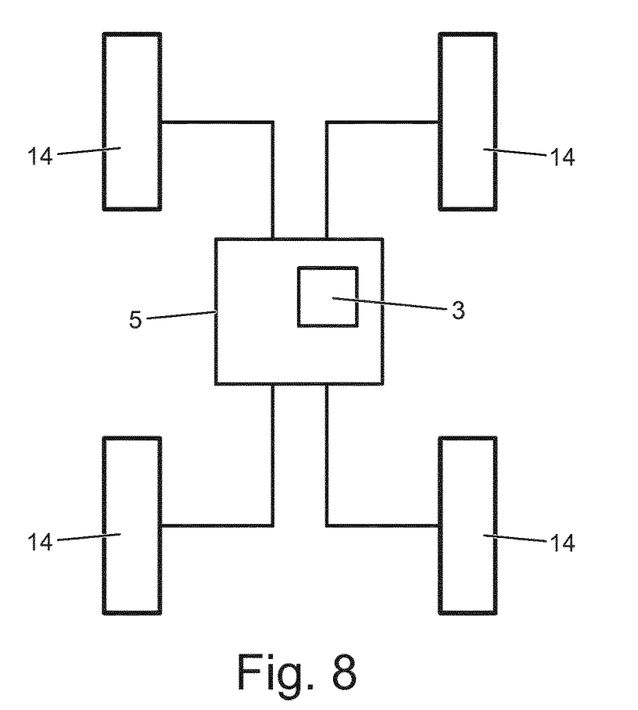
FIG. 8 shows a drive system for an electric machine that includes the electric machine of FIGS. 6 and 7.

A stator 1 and a stator housing 2 for an electric machine 3 (see FIG. 6) in accordance with an embodiment of the present invention is described herein with reference to the accompanying Figures. Also described herein in accordance with embodiments of the present invention are a stator 1 for an electric machine 3, a stator housing 2 for an electric machine 3, a method of manufacturing a stator housing for an electric machine 3, a drive system 5 (see FIG. 8) for an electric vehicle 15, and to the vehicle 15 incorporating the drive system 5 (see FIG. 9).

Embodiments of the invention are described with specific reference to an electric motor. However, other types of electric machines 3 are within the scope of the invention, such as electric generators.

Figure 1:
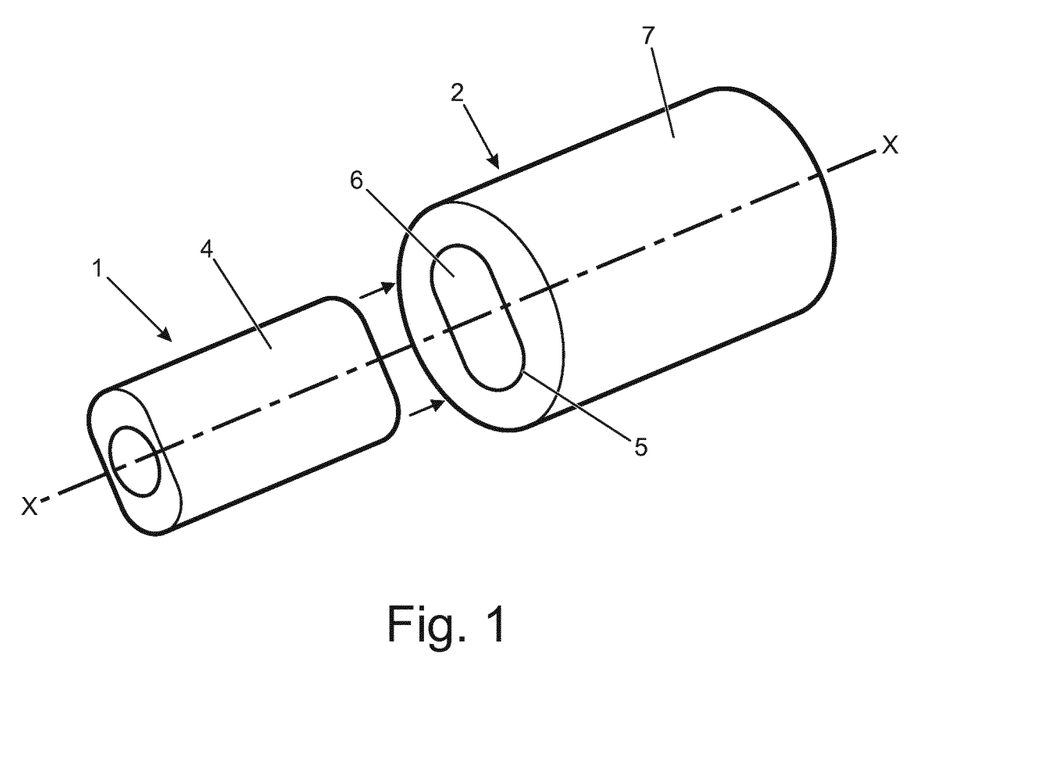
FIG. 1 shows a perspective view of a stator and a stator housing prior to insertion of the stator into the stator housing in a direction along a longitudinal axis.

With particular reference to FIG. 1, there is shown a perspective view of a stator 1 and a stator housing 2 prior to insertion of the stator 1 into the stator housing 2 in the direction of the longitudinal axis X-X of the stator 1 and the stator housing 2 during assembly. The stator 1 is formed from a plurality of steel laminations 1a and windings 1b, and has an exterior surface 4 that extends about the longitudinal axis X-X. Upon assembly, a rotor 13 (see FIG. 6), is received within the stator 1 so that it will rotate about the longitudinal axis X-X during operation of the electric motor 3. The exterior surface 4 of the stator 1 defines the entire outer periphery of the stator 1.

The stator housing 2 has a longitudinally extending opening 5 that defines an interior surface 6 of the stator housing 2.

During assembly, the stator housing 2 is heated so that it expands to enable the stator 1 to be inserted into the opening 5 in the stator housing 2. The stator 1 and the opening 5 in the stator housing 2 are dimensioned such that, when the stator housing 2 is allowed to cool following insertion of the stator 1 into the stator housing 2, the stator housing 2 contracts or shrinks so that it binds or mates with the stator 1, thereby coupling the stator housing 2 to the exterior surface 4 of the stator 1. In an alternative assembly technique, the stator 1 may be cooled so that it contracts to enable it to be inserted into the opening 5 in the stator housing 2.

To prevent relative rotation of the stator 1 and stator housing 2 at high operating temperatures, the opening 5 in the stator housing 2, and the stator 1, are shaped so that rotation is prevented. FIGS. 2A to 2D illustrate cross-sections through a stator housing 2 in a plane extending perpendicular to the longitudinal axis, according to four different embodiments. In each embodiment, the opening 5 extending through the stator housing 2 in which the stator 1 is received is of a different shape. In each case, the stator housing 2 has an external curved surface 7 which is cylindrical, or circular in cross-section. However, it will be understood that the external curved surface 7 of the stator housing 2 may have a different shape. For example, the external curved surface 7 may complement the shape of the opening 5 in the stator housing 2.

Figure 2A:
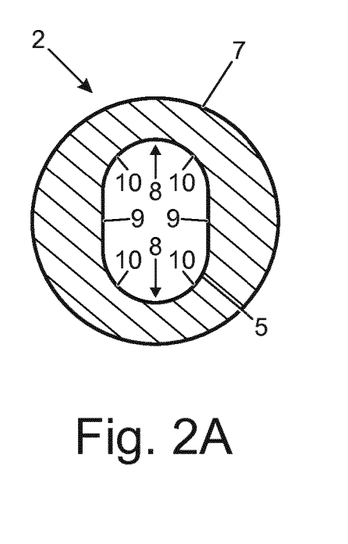
FIGS. 2A, 2B, 2C and 2D each show cross-sections through the stator housing in a plane extending perpendicular to the longitudinal axis, according to four separate embodiments, respectively.

With reference to FIG. 2A, the shape of the opening 5 in the stator housing 2 lying in a plane perpendicular to the longitudinal axis X-X comprises semi-circles 8, each formed from two quarter circle arcs 10, connected by first and second lines 9 tangent to the endpoints of the semi-circles 8. The first and second lines 9 are preferably straight and parallel to each other. In geometry, this shape is known as 'obround'.

Figure 2B:
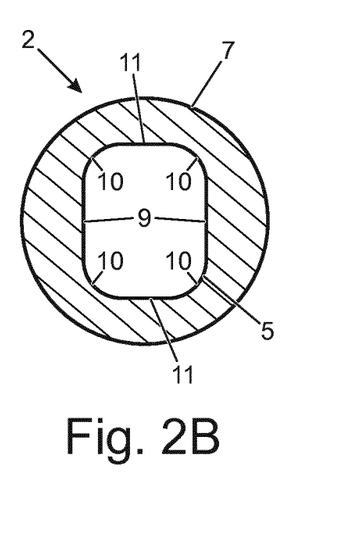

With reference to FIG. 2B, the opening 5 comprises four quarter circle arcs 10 each of which are separated from each other a non-zero distance provided by the first and second lines 9, but also by third and fourth lines 11. The first and second lines 9 are preferably straight and parallel to each other, and the third and fourth lines 11 are preferably straight and parallel to each other. The third and fourth lines 11 lie at right angles to the first and second lines 9. In FIG. 2B, the first and second lines 9 are longer than the third and fourth lines 11.

Figure 2C:
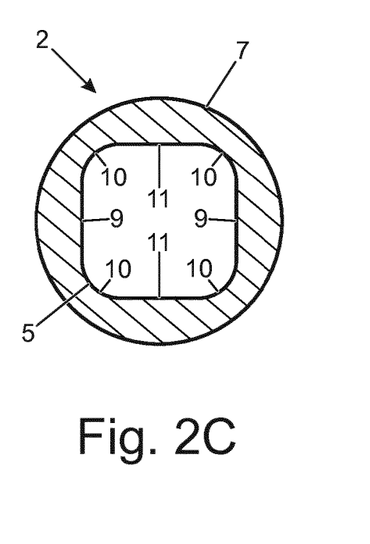

The embodiment of FIG. 2C is similar to that of FIG. 2B, except the first, second, third and fourth lines 9, 11 are all of the same length. In geometry, this shape is known as a 'rounded square'.

Figure 2D:
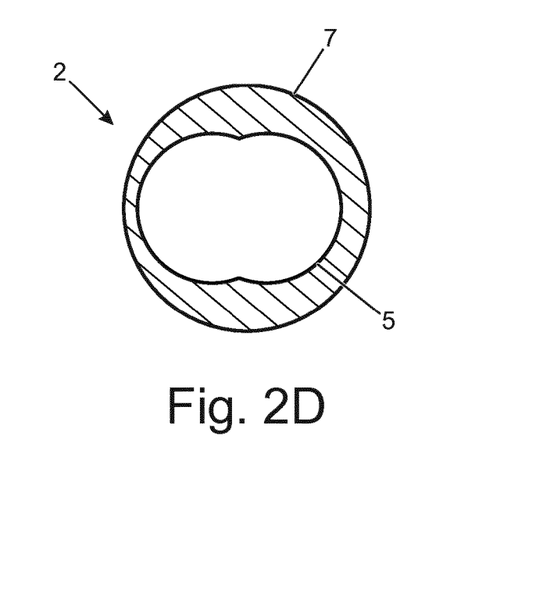

FIG. 2D represents another embodiment in which the shape of the cross-section of the opening 5 in the stator housing 2 comprises two overlapping circles each having the same radius.

In each of the embodiments referred to above, the shape of the opening 5 extends for the full length of the stator housing 2 in a direction along the longitudinal axis X-X. The exterior surface 4 of the stator 1, which is received in the opening 5 in the stator housing 2, has a shape which complements the shape in the stator housing 2.

Upon assembly, the stator housing 2 is shrink-fitted to the stator 1 by heating the stator housing 2 so that it expands sufficiently to enable the stator 1 to be slid into the opening 5 in the direction along the longitudinal axis X-X, or by cooling the stator 1 so that it contracts to enable the stator 1 to be slid into the stator housing 2. Once the stator 1 is located within the stator housing 2, the assembly is allowed to cool so that the stator housing 2 contracts and applies pressure to the stator 1 and the inner surface 6 of the stator housing 2 abuts, binds or mates with the exterior surface 4 of the stator 1.

As a result of the surfaces 4, 6 abutting, binding or mating with each other due to the shrink-fitting process, rotation of the stator 1 relative to the stator housing 2 is prevented. Furthermore, the generation of undesirable stress concentrations in the stator 1, or in the stator housing 2, is also reduced or avoided.

The manufacture of a stator housing 2 having each of the openings described above with reference to FIGS. 2A to 2D will now be described with reference to FIGS. 3A to 3B, 4A to 4D, and FIG. 5, all of which show the shape of the opening 5 with the longitudinal axis X-X extending at right angles to the plane of the Figure.

Figure 3A:
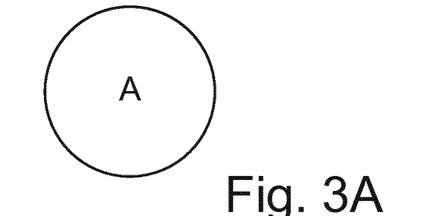
FIGS. 3A and 3B are diagrams to illustrate how one shape of opening is formed in the stator housing.
Figure 3B:
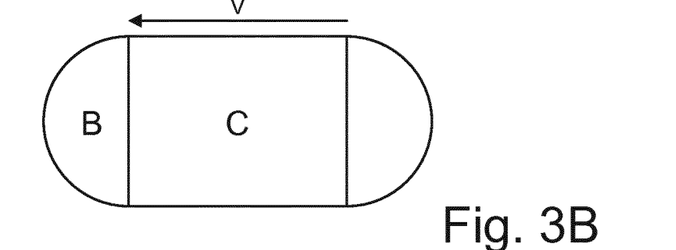

FIG. 3A shows a first step in a two step process for forming a stator housing 2 having an opening 5 with the shape illustrated in FIG. 2A. In this first step, a circular cutting tool of the appropriate diameter is plunged in an axial direction into the workpiece from which the stator housing 2 is to be made, to form a cylindrical hole, marked 'A' in FIG. 3A. The second step in the process is illustrated in FIG. 3B, from which it can be seen that after plunging the circular cutting tool to cut cylindrical hole 'A', and before removing it from the hole, the circular cutting tool is translated in a single linear direction 'V', so as to cut areas marked 'C' and 'B'. After cutting areas 'C' and 'B', the circular cutting tool is withdrawn in the opposite axial direction to insertion to complete the formation of the opening 5. As a result of moving the cutting tool in this way, an obround shaped opening is cut in the stator housing 2. It will be understood that instead of translating the cutting tool linearly in direction 'V', the cutting tool could follow an arcuate path to cut an arcuately shaped opening.

Figure 4A:
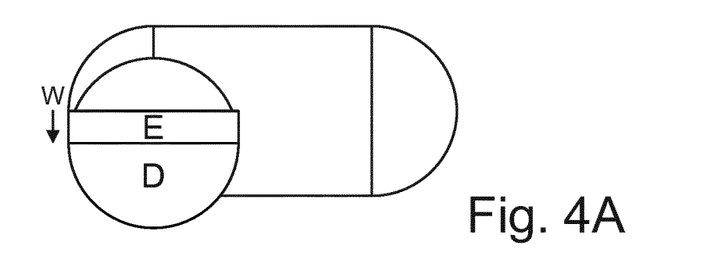
FIGS. 4A to 4D are diagrams to illustrate how another shape of opening is formed in the stator housing.
Figure 4B:
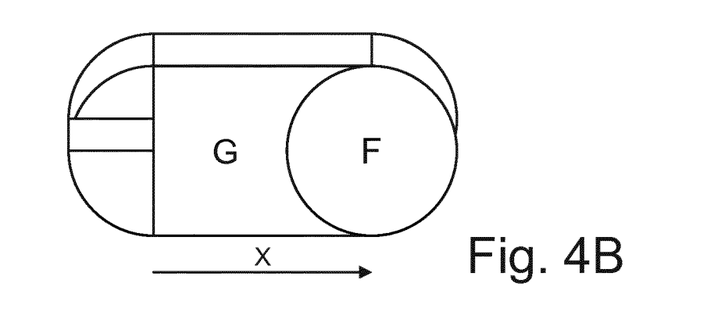
Figure 4C:
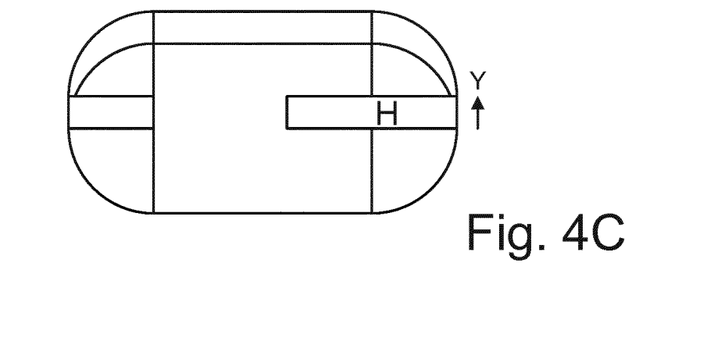

FIGS. 4A to 4C show how the process may be continued, prior to withdrawing the cutting tool from the material, and after translating it in the single linear direction 'V', to form an opening of a different shape. With particular reference to FIG. 4A, it will be seen that once the tool has been translated in linear direction 'V' to cut areas 'C' and 'B', the cutting tool is translated in a second linear direction marked 'W', at right angles to linear direction 'V', to cut the area marked 'E'. As shown in FIG. 4B, once area 'E' has been cut, the cutting tool is translated back, in a linear direction marked 'X', which is opposite to direction 'V', so as to cut portions of areas marked 'G' and 'F'.i.e. those portions of areas 'G' and 'F' which have not already been cut as a result of the initial translation of the cutting tool in direction 'V'. When translated in direction 'X', the cutting tool also cuts part of area marked 'H'. After translating the cutting tool in linear direction 'X', it is translated in a direction marked 'Y', as shown in FIG. 4C, which is opposite to direction 'W'. The cutting tool is translated in the direction 'Y' by a distance sufficient to return it to its original starting position 'A', and by doing the cutting of area 'H' is finished. As a result of manipulating the cutting tool as described and shown in FIGS. 4A to 4C, an opening having the shape illustrated in FIG. 2B is formed. As previously described, this shape has four quadrant arcs 10 separated by two sets of parallel lines 11, 12.

Figure 4D:
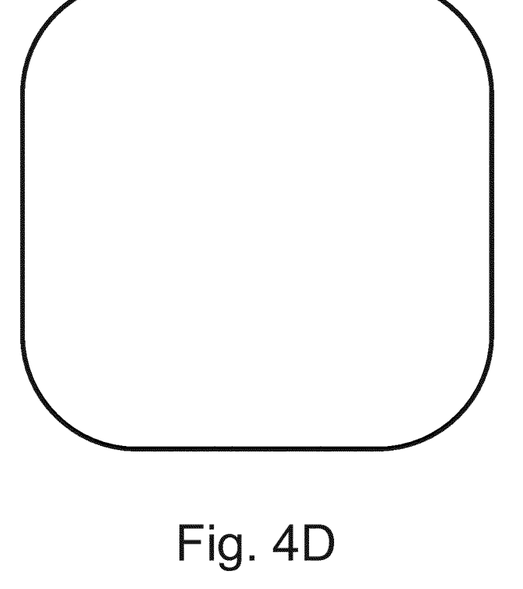

By translating the tool by a distance 'W' and 'Y' which is the same as the distance 'V' and 'X', an opening as shown in FIGS. 4D and 2C is formed. As previously described, this shape has four quadrant shaped arcs 10 separated by two sets of parallel lines, in which the parallel lines are all of the same length. It will be understood that this shape may be cut in stages, i.e. by repeatedly translating the cutting tool in directions 'V' and 'X', and by translating the cutting tool in directions 'W' and 'Y' by a distance less than the distance translated in direction 'V' and 'X' between each translation in direction 'V' and 'X', until the shape of opening shown in FIGS. 2C and 4D and is formed. A similar technique may be used to cut an opening with a shape that has two sets of parallel lines 11, 12 in which each set has lines of different lengths.

By translating the tool by a distance 'W' and 'Y' which is the same as the distance 'V' and 'X', an opening as shown in FIGS. 4D and 2C is formed. As previously described, this shape has four quadrant shaped arcs 10 separated by two sets of parallel lines, in which the parallel lines are all of the same length. It will be understood that this shape may be cut in stages, i.e. by repeatedly translating the cutting tool in directions 'V' and 'X', and by translating the cutting tool in directions 'W' and 'Y' by a distance less than the distance translated in direction 'V' and 'X', between each translation in direction 'V' and 'X', until the shape of opening shown in FIGS. 2C and 4D and is formed. A similar technique may be used to cut an opening with a shape that has two sets of parallel lines 11, 12 in which each set has lines of different lengths.

As previously mentioned, rather than translating the cutting tool linearly, it may also be controlled so as to follow an arcuate path.

Figure 5:
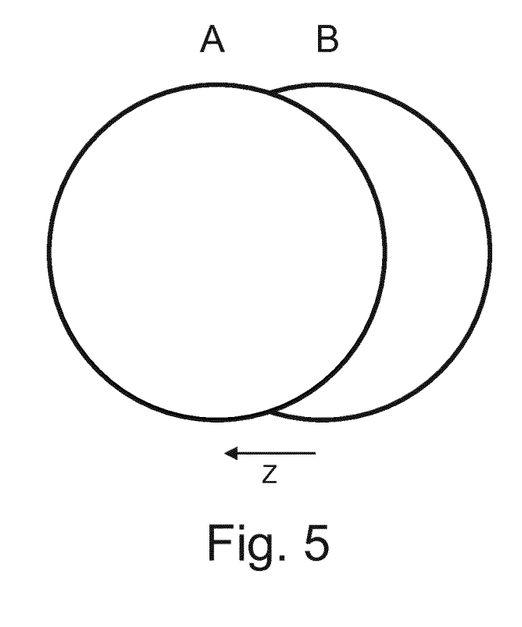
FIG. 5 is a diagram to illustrate how yet another shape of opening is formed in the stator housing.

With reference to the embodiment of FIG. 5, the circular cutting tool is plunged into the workpiece in a longitudinal direction to form a cylindrical opening, as described with reference to FIG. 3A. However, in this embodiment, the circular cutting tool is removed in from the material in the opposite direction prior to translating the cutting tool in the direction Z by a distance which is at least less than a diameter of the cylindrical opening and, preferably, by a distance which is less than a radius of the opening. Once the circular cutting tool has been translated in the direction Z, it is plunged into the workpiece again, before being extracted in the opposite direction. In this embodiment, the cutting tool is not translated whilst being located in the workpiece.

Figure 6:
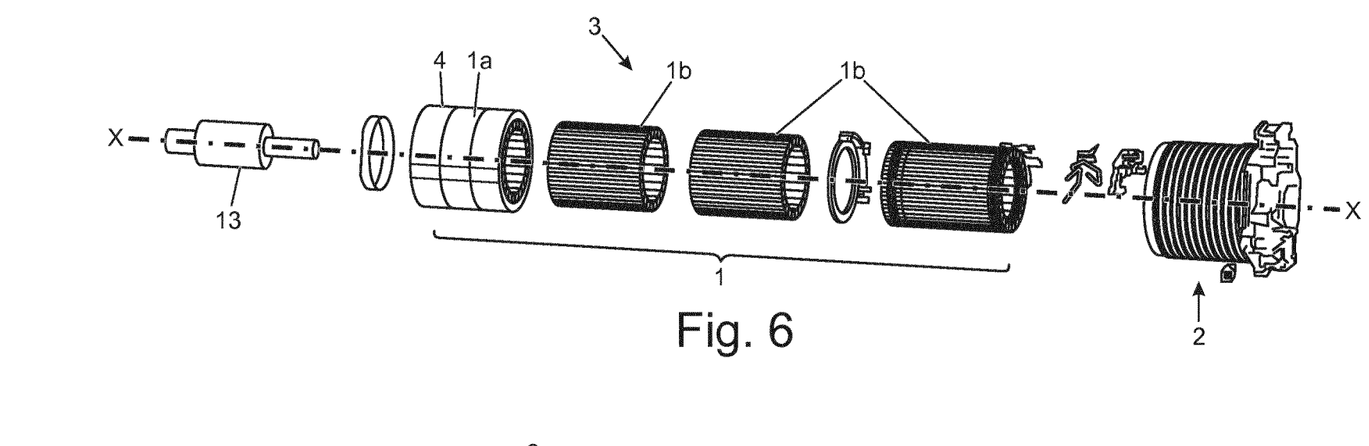
FIG. 6 shows an exploded perspective view of an electric machine.
Figure 7:
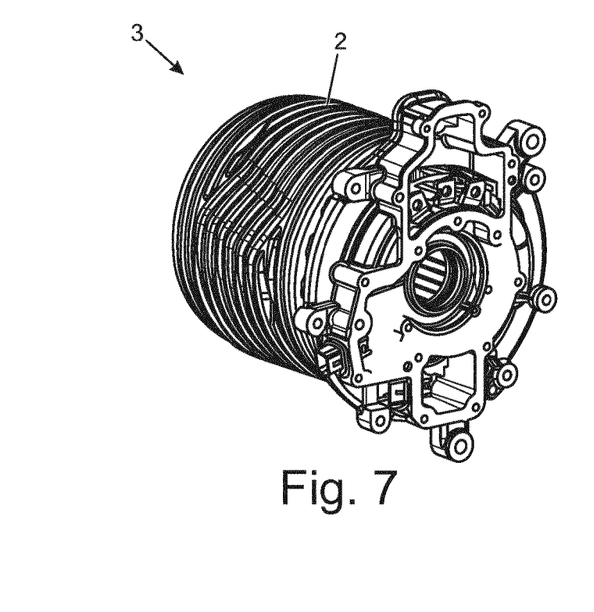
FIG. 7 shows an assembled view of the electric machine of FIG. 6.

With reference to FIG. 6, there is shown an electric motor assembly that comprises the stator 1, the stator housing 2 and the rotor 13. The stator housing 2 according to embodiments is also shown in FIG. 7. An assembled electric motor 3 includes a rotor 13 mounted for rotation within the stator 1 and stator housing 2.

Figure 9:
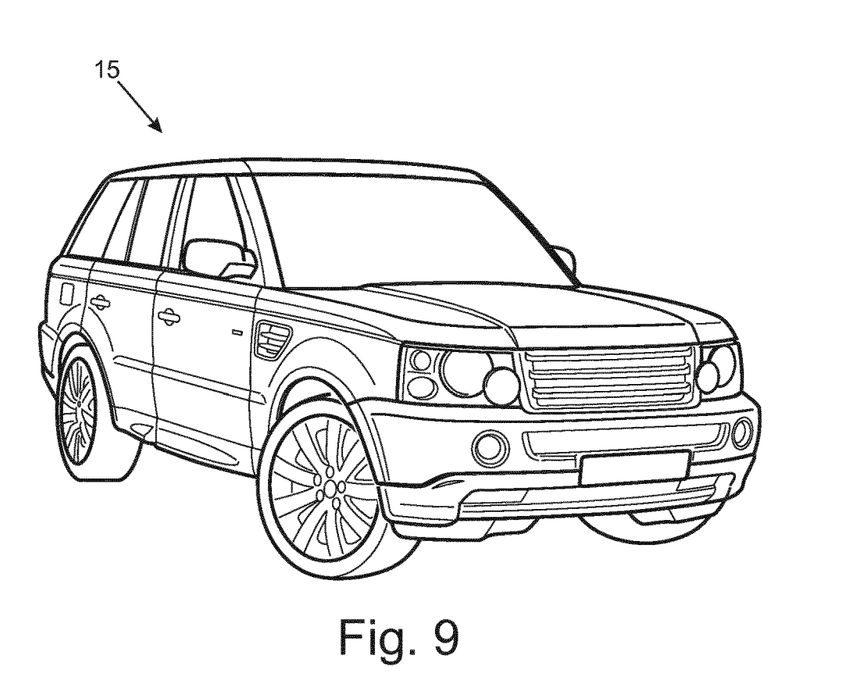
FIG. 9 shows a vehicle in accordance with an embodiment of the invention.

The electric motor 3 may form part of a drive system 5 (see FIG. 8), for an electric vehicle 15 shown in FIG. 9. The drive system 5 includes the electric motor 3 which is operatively connected to some, or all, of the wheels 14 of the vehicle 15.

It will be appreciated that the electric motor 3 according to embodiments of the invention may also be employed for tasks other than for providing the main driving force of the vehicle 15.

It will be appreciated that various changes and modifications can be made to the present invention without departing from the scope of the present application.

The invention claimed is:

1. A stator and a stator housing for an electric machine, the stator housing comprising an opening to receive the stator in a direction extending along a longitudinal axis of the electric machine to enable the stator housing to be shrink-fitted to the stator, wherein the stator includes an exterior surface that extends about the longitudinal axis, wherein the opening of the stator housing defines an interior surface of the stator housing, wherein the stator has a corresponding shape to the stator housing, wherein the shape of the opening in the stator housing lying in a cross-sectional plane perpendicular to the longitudinal axis comprises four quarter circle arcs, with at least two of the quarter circle arcs being separated by a non-zero distance, wherein the shape of the stator lying in a cross-sectional plane perpendicular to the longitudinal axis comprises four quarter circle arcs, with at least two of the quarter circle arcs being separated by a non-zero distance, wherein the stator housing is shrink-fit to contact an entire exterior surface of the stator, and wherein the shape of the opening is the shape of the interior surface and the shape of the stator is the shape of the exterior surface.

2. The stator and the stator housing according to claim 1, wherein each of the four quarter circle arcs of the stator housing is separated from each of the other of the four quarter circle arcs of the stator housing by a non-zero distance and each of the four quarter circle arcs of the stator is separated from each of the other of the four quarter circle arcs of the stator by a non-zero distance, or wherein the shape of the opening in the stator housing lying in said cross-sectional plane comprises a first line extending between one end of each of two of said four quarter circle arcs, and a second line extending between one end of each of the other two quarter circle arcs.

3. The stator and the stator housing according to claim 2, wherein the first and second lines are straight and parallel to each other, each of said first and second lines extending at a tangent to said ends of said quarter circle arcs.

4. The stator and the stator housing according to claim 2, wherein the opposite ends of two of the four quarter circle arcs which do not have either the first or second lines extending between them, are connected by a third line, the opposite ends of the other two quarter circle arcs, which do not have either the first or second lines extending between them, also being connected by a fourth line.

5. The stator and the stator housing according to claim 4, wherein the third and fourth lines are straight and parallel to each other, each of said third and fourth lines extending at a tangent to the opposite ends of said quarter circle arcs.

6. The stator and the stator housing according to claim 2, wherein the opposite ends of two of the four quarter circle arcs have a zero distance between them, the opposite ends of the other two of the four quarter circle arcs also having a zero distance between them.

7. The stator and the stator housing according to claim 1, wherein the shape of the opening in the stator housing lying in a cross-sectional plane perpendicular to the longitudinal axis at any point along said longitudinal axis is the same.

8. A method of manufacturing a stator housing for an electric machine, the stator housing comprising an opening configured to receive a stator inserted into the opening in a direction extending along a longitudinal axis of the electric machine to enable the stator housing to be shrink-fitted to the stator, wherein the shape of the opening in the stator housing lying in a cross-sectional plane perpendicular to the longitudinal axis comprises four quarter circle arcs, with at least two of the quarter circle arcs being separated by a non-zero distance, wherein the shape of the stator lying in a cross-sectional plane perpendicular to the longitudinal axis comprises four quarter circle arcs, with at least two of the quarter circle arcs being separated by a non-zero distance, the method of manufacturing the stator housing comprising:
 plunging a circular cutting tool in a first axial direction into material from which the stator housing is to be formed to form a circular opening;
 translating the circular cutting tool in a first direction extending at right-angles to the longitudinal axis; and
 removing said circular cutting tool in a second axial direction,
 the stator housing manufactured having a corresponding shape to the stator housing.

9. The method according to claim 8, further comprising, following said translating the circular cutting tool in the first direction extending at right-angles to the longitudinal axis and prior to removing said circular cutting tool in the second axial direction:
 translating the circular cutting tool in a second direction extending at right angles to the longitudinal axis and at right angles to the first direction;
 translating the circular cutting tool in a third direction extending at right-angles to the longitudinal axis in a direction opposite and parallel to the first direction; and
 translating the circular cutting tool in a fourth direction extending at right angles to the longitudinal axis and at right angles to the first direction, in a direction opposite and parallel to the second direction.

10. The method according to claim 8, comprising:
 removing said circular cutting tool in a second axial direction following said plunging the circular cutting tool in the first axial direction and prior to translating the circular cutting tool in the first direction extending at right-angles to the longitudinal axis; and
 plunging said circular cutting tool in the first axial direction following said translating the circular cutting tool in the first direction extending at right-angles to the longitudinal axis.

11. An electric machine assembly comprising the stator and the stator housing of claim 1, and a rotor mounted for rotation about the longitudinal axis within the stator, in which the stator housing is shrink-fitted to the stator.

12. A vehicle incorporating the stator and the stator housing according to claim 1.

13. The stator and the stator housing according to claim 5, wherein the shape of the opening in the stator housing in a cross-sectional plane perpendicular to the longitudinal axis is a rounded square.

14. The stator and the stator housing according to claim 6, wherein shape of the opening in the stator housing lying in a cross-sectional plane perpendicular to the longitudinal axis is obround.

15. The method according to claim 8, wherein translating the circular cutting tool in a direction extending at right-angles to the longitudinal axis forms an opening in said material that has a shape, lying in a cross-sectional plane perpendicular to the longitudinal axis, which is obround.

16. The method according to claim 9, wherein translating the circular cutting tool in said first, second, third and fourth directions forms an opening in said material that has a shape, lying in a cross-sectional plane perpendicular to the longitudinal axis, which is a rounded square.

17. The method according to claim 8, wherein the stator housing is shrink-fitted to the stator, and wherein only the shrink-fit couples the stator and the stator housing together.

18. The method according to claim 8, wherein the stator housing is shrink-fit to contact an entire outer surface of the stator.

19. The stator and the stator housing according to claim 1, wherein the stator housing is shrink-fitted to the stator, and wherein only the shrink-fit couples the stator and the stator housing together.

20. The stator and the stator housing according to claim 1, wherein the stator housing is shrink-fit such that an entirety of the interior surface contacts the entire exterior surface of the stator.

* * * * *